C. EVANS.
Stove Grate.
No. 14,007.
Patented Dec. 25, 1855.
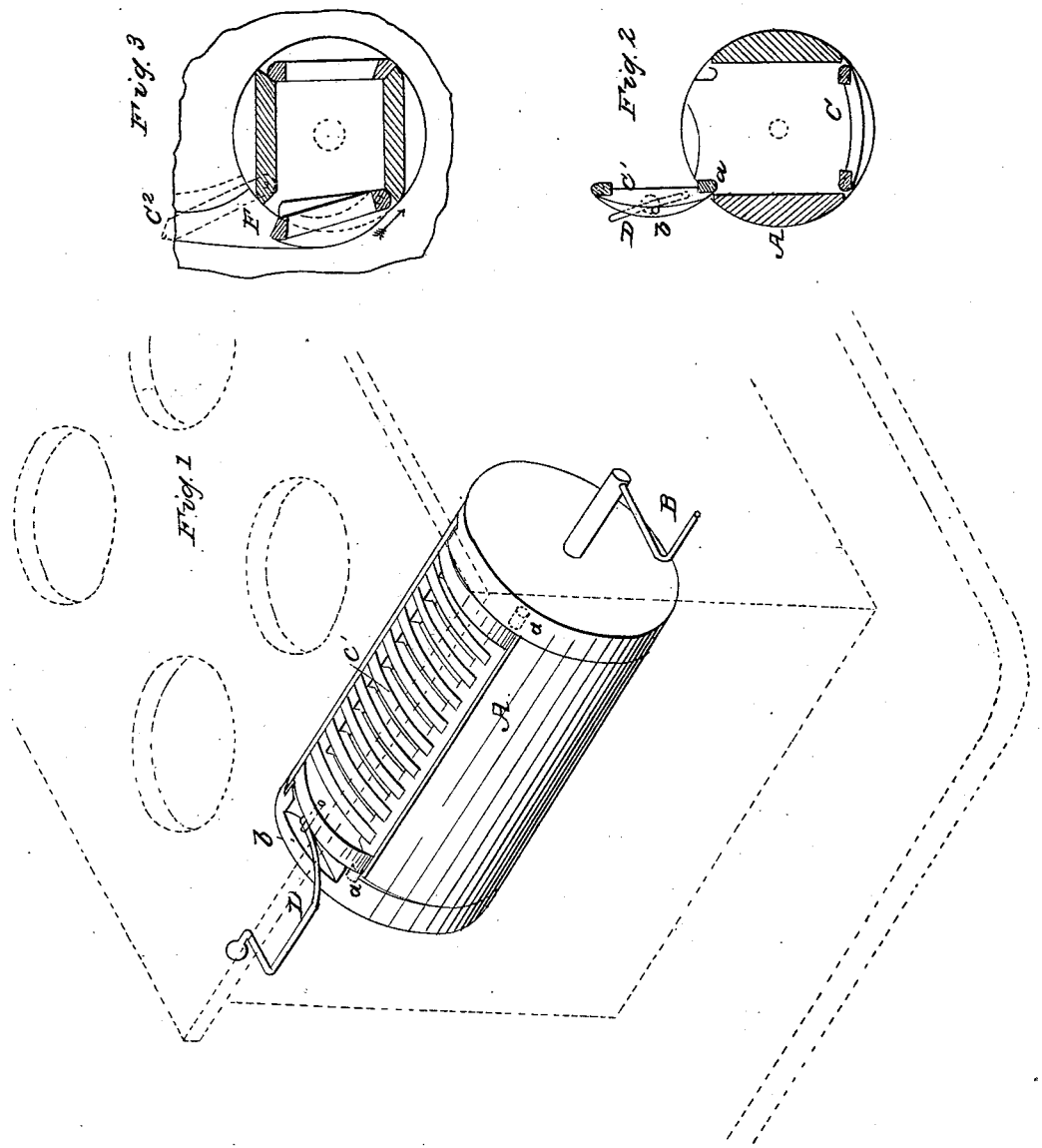

UNITED STATES PATENT OFFICE.

CHARLES EVANS, OF CHARLESTOWN, MASSACHUSETTS, ASSIGNOR TO C. EVANS AND G. K. GOODWIN.

REVOLVING GRATE.

Specification of Letters Patent No. 14,007, dated December 25, 1855.

*To all whom it may concern:*

Be it known that I, CHAS. EVANS, of Charlestown, in the county of Middlesex and State of Massachusetts, have invented a new and Improved Grate for Burning Anthracite Coal, of which the following is a full, clear, and exact description, reference being had to the accompanying drawings, in which—

Figure 1 is an isometric view of my grate as applied to an ordinary cooking stove; Fig. 2, a transverse section through the same; Fig. 3, a modification which will be referred to hereafter.

In the accompanying drawings, A is the fire pot which is made cylindrical and caused to revolve within circular depressions in the side of the stove.

C, C', are the fire grates which are hinged at $a$ to the circular heads of the fire pot these grates are kept closed upon the fire pot, by the circular recesses in which the latter revolves. From the top of these recesses the sides of the stove are cut away to enable the grate to be swung up from the fire pot, as seen in Fig. 2. This is accomplished by means of the bent lever D having a handle projecting outside of the stove which enters beneath the pin $b$, upon one end of the grate. By turning this lever the grate is thrown into the position seen at C', Fig. 2, in which position it may form the front grate of the stove.

It often happens that the dead coal, and cinders which collect upon the bottom grate of stoves as at present constructed, render it impossible to rekindle the fire when it commences to decline without first emptying the grate and clearing out the old coals. With my fire pot this necessity is entirely obviated. In such case it is simply necessary to shake the grate back and forth, to remove the ashes, then to add a fresh supply of coal, kindlings, and fire, to return the grate C', into the position seen in Fig. 1, and to revolve the fire pot half around until this grate be at the bottom, and the other grate C, on top; the fire is now at the bottom, the kindling next, then the fresh coal, and upon the top of the whole the dead coals, in which position they will be readily consumed, and the necessity of frequently clearing out the grate will be avoided, the dead coals being all consumed without the necessity of removing them from the grate.

In Fig. 3 is seen a modification of my invention in which so long as the fire pot is turned in the direction indicated by the arrows, both the grates will remain closed when however the fire pot is revolved in a contrary direction the grates enter the grooves F, and are carried up into the position seen in red at $C^2$, Fig. 3, the top of the fire pot being opened as required.

What I claim as my invention and desire to secure by Letters Patent, is—

The method herein described of having the cylinder within the recesses in the sides of the stove, and of raising the grate to its upright position as set forth.

CHARLES EVANS.

Witnesses:
SAM. COOPER,
P. E. TESCHEMACHER.